United States Patent [19]

Hickok et al.

[11] Patent Number: 5,868,926
[45] Date of Patent: Feb. 9, 1999

[54] ROTATING BIOLOGICAL FILTER SYSTEM

[75] Inventors: Roy S. Hickok, Moorpark; Roger W. McGrath, Simi Valley, both of Calif.

[73] Assignee: Aquaria, Inc., Moorpark, Calif.

[21] Appl. No.: 437,149

[22] Filed: May 2, 1995

Related U.S. Application Data

[63] Continuation of Ser. No. 381,533, Feb. 1, 1995, abandoned, which is a continuation-in-part of Ser. No. 4,677, Jan. 14, 1993, Pat. No. 5,419,831, which is a continuation of Ser. No. 708,478, May 31, 1991, abandoned, which is a continuation-in-part of Ser. No. 535,905, Jun. 11, 1990, abandoned.

[51] Int. Cl.⁶ .................................................. C02F 3/08
[52] U.S. Cl. ......................... 210/150; 210/151; 210/169
[58] Field of Search .................................. 210/150, 151, 210/169

[56] References Cited

U.S. PATENT DOCUMENTS

| | | | |
|---|---|---|---|
| 1,811,181 | 6/1931 | Maltby | 210/150 |
| 2,696,800 | 12/1954 | Rork | 119/5 |
| 2,877,051 | 3/1959 | Cushman et al. | 299/3 |
| 3,723,304 | 3/1973 | Storck | 210/151 |
| 3,849,304 | 11/1974 | Torpey et al. | 210/151 |
| 3,869,380 | 3/1975 | Torpey | 210/614 |
| 3,957,634 | 5/1976 | Orensten et al. | 210/169 |
| 4,157,303 | 6/1979 | Yoshikawa et al. | 210/150 |
| 4,160,736 | 7/1979 | Prosser | 210/150 |
| 4,267,051 | 5/1981 | Uhlmann | 210/150 |
| 4,268,385 | 5/1981 | Yoshikawa | 210/150 |
| 4,282,095 | 8/1981 | Tsuhako | 210/169 |
| 4,284,503 | 8/1981 | Stahler | 210/150 |
| 4,364,826 | 12/1982 | Kato | 210/150 |
| 4,622,148 | 11/1986 | Willinger | 210/169 |
| 4,737,278 | 4/1988 | Miller | 210/151 |
| 5,078,867 | 1/1992 | Danner | 210/169 |
| 5,160,622 | 11/1992 | Gunderson et al. | 210/169 |
| 5,228,986 | 7/1993 | Ellis et al. | 210/169 |
| 5,419,831 | 5/1995 | Fuerst et al. | 210/151 |
| 5,423,978 | 6/1995 | Snyder et al. | 210/151 |

FOREIGN PATENT DOCUMENTS

| | | |
|---|---|---|
| 571489 | 1/1982 | Japan . |
| 62-97694 | 5/1987 | Japan . |
| WO8504306 | 10/1985 | WIPO . |
| WO8605770 | 10/1986 | WIPO . |
| WO9119680 | 12/1991 | WIPO . |
| WO9221620 | 12/1992 | WIPO . |

OTHER PUBLICATIONS

"Filtration Techniques for Small–Scale Aquaculture in a Closed System" by Steve D. Van Gorder et al. (dated prior to filing date of present application).

"Biodisc Waterwheel: A Design Alternative and its Application for an Air–Driven Fish Culture System" by Doublas J. Strange et al. (1985).

U.S. application serial No. 08/125,445, filed Sep. 22, 1993.

Marineland Power Wet/Dry Biological Filter, Aquaria, Inc., Jan. 1993.

Marineland Wet/Dry Biological Filter Models PRO 30/PRo 60, Aquaria, Inc. Jan. 1993.

Marineland Commercial Aquariums Model #LB–12BW, dated prior to filing date of present application but after Mar. 1994.

Search report dated Dec. 5, 1994, PCT application serial No. PCT/US94/09580, filed Aug. 24, 1994.

U.S. application serial No. 08/382,371, filed Feb. 1, 1995.

U.S. application serial No. 08/367,843, filed Dec. 30, 1994.

*Primary Examiner*—Thomas G. Wyse
*Attorney, Agent, or Firm*—Pillsbury Madison & Sutro

[57] ABSTRACT

A biological filter for treating water in an aquatic system, composed of a porous water absorbing body of material adapted for rotation, and a member for supplying water to the body to be absorbed by a portion of the body so as to cause the body to rotate, wherein the member for supplying water to the body is composed of a receptacle located above the water absorbing body, the receptacle defining a water holding volume having a bottom, and the bottom being provided with at least one opening via which water flows out of the volume and onto the water absorbing body under the force of gravity.

40 Claims, 5 Drawing Sheets

ROTATING BIOLOGICAL FILTER SYSTEM

CROSS-REFERENCE TO RELATED APPLICATIONS

This is a continuation application of Ser. No. 08/381,533, filed Feb. 1, 1995, abandoned, which in turn is a continuation-in-part of application Ser. No. 08/004,677, filed Jan. 14, 1993, now U.S. Pat. No. 5,419,831, which is a continuation of application Ser. No. 07/708,478, filed May 31, 1991, abandoned, which is itself a continuation-in-part of application Ser. No. 07/535,905, filed Jun. 11, 1990, abandoned.

BACKGROUND OF THE INVENTION

1. Field of the Invention

The present invention relates to aquatic filter systems and, more particularly, to aquatic filter systems having biological filter elements. More specifically, the invention is directed to further improvements in filter systems employing a rotary filter element composed at least in part of a body of porous material.

2. Description of Related Art

Under ideal conditions, aquatic systems including aquariums, fish ponds, and commercial fish and lobster holding tanks, will act as substantially self-contained ecosystems. That is, except for the need of the aquatic system operator to provide food to the fish within the system, the ideal aquatic system should maintain itself as an environment suitable to sustain and foster the healthy growth of the aquatic life which it contains. However, the aquatic life within the system will typically release wastes and other byproducts into the system water. In time, the buildup of undesirable wastes and pollutants can reach toxic levels and eventually poison the aquatic life within the system. As a result, it is necessary for an aquatic system to include a system for filtering and purifying the system water to eliminate undesirable wastes and toxins and to maintain a healthy environment.

Typical aquatic filters rely on mechanical filtration to remove detritus from the system water. Such a mechanical filter can be one of several types. For example, in under gravel type filtration systems for aquariums, a pump circulates the aquarium water through a bed of gravel supported on a suitable structure. The gravel bed, which is typically located within the aquarium, traps and removes solid wastes and detritus from the water as it flows through the bed. In other mechanical filtration systems, a pump removes aquarium water from the aquarium and circulates the water through a filter element and back into the aquarium. Like the gravel bed, the filter element traps and removes harmful detritus from the circulating aquarium water.

In addition to mechanical filtration, chemical filtration can be used to maintain a life-supporting environment within an aquatic system. Chemical filtration systems typically circulate the system water through a chemical filter element, such as activated carbon. This type of filtration is helpful in removing dissolved organic compounds and carbon dioxide and can help to maintain a stable pH within the aquatic system.

However, neither mechanical nor chemical filtration techniques are typically effective in removing such waste byproducts as ammonia, nitrites, or nitrates. Some of these nitrogen based contaminants, particularly ammonia, can be extremely harmful to the types of aquatic life typically found in aquatic systems. An effective method of removing such contaminants is biological filtration. Biological filtration relies on the presence of aerobic bacteria to convert some water born toxic wastes, particularly ammonia, to nontoxic or less toxic substances. It is possible for aerobic bacteria to grow, to a limited extent, on mechanical filter elements. Thus there may be some biological filtration along with the mechanical filtration described above.

However, typically, the aerobic bacteria which grows on the mechanical filter elements, or the under gravel bed, must rely on the dissolved oxygen present in the water for its growth. As a result of the limited availability of oxygen, coupled with reduced water flow as the filter becomes plugged, the amount of aerobic bacteria, and hence the degree of biological filtration, associated with mechanical filter elements or under gravel beds is inherently limited. Further, as mechanical filter elements become plugged with detritus, they must be replaced in order to maintain water flow. Each time a filter element is replaced, any aerobic bacteria which may have colonized the filter element are removed from the system and the colonization must restart on the new filter element. During the recolonization period, the environmental balance within the system may be jeopardized by the absence of sufficient amounts of aerobic bacteria.

Trickle filters have been devised as one method of fostering the growth of aerobic bacteria and increasing the efficiency of the biological filtration process. In trickle filters, water is typically removed from the aquarium, tanks or pond and allowed to trickle over a bed of lava rock, plastic balls, or the like. Because the filter bed is not submerged, there is more oxygen available for the growth of aerobic bacteria. However, trickle filters can take up a relatively large area and usually require dedicated plumbing and pump fixtures. As a result, such filters can be expensive and impractical in many applications in which a large amount of water is required to be treated.

Large scale waste water treatment facilities frequently use rotating biological contactors in an effort to promote the growth of aerobic bacteria. Rotating biological contactors typically include a number of partially submerged filter elements, frequently disc shaped, mounted along a central shaft. The central shaft is driven to rotate the elements such that at least a portion of each filter element is alternately submerged and exposed to the air. In this manner, the growth of aerobic bacteria on the surface of the filter elements is promoted by the intermittent exposure to the oxygen in the air and the biological filtration of the waste water is promoted by the intermittent submersion of the bacteria bearing surfaces. However, rotating biological contactors from waste water treatment facilities are usually not readily compatible for use with aquariums, fish holding tanks and ponds. In part, this is due to their large size, the need for a separate drive mechanism, the lack of an appropriate location for such a device within the aquarium, tank or pond, and the lowered efficiency in biological filtration when the size of the rotating biological contactors is reduced for use with aquatic systems.

Rotating biological filters which are intended primarily for use in home or office aquariums are described in copending application Ser. No. 08/004,678, filed Jan. 14, 1993, entitled "Rotating Biological Aquarium Filter System" (which is a continuation of application Ser. No. 07/535,905, filed Jun. 11, 1990) and application Ser. No. 08/004,677, filed Jan. 14, 1993, entitled "Rotating Biological Aquarium Filter System" (which is a continuation of application Ser. No. 07/708,478, filed May 31, 1991 which in turn is a continuation-in-part application of application Ser. No.

07/535,905, filed Jun. 11, 1990), the subject matter of these applications being hereby incorporated by reference in their entireties. However, these aquarium filters are not readily adapted to use in large commercial holding tanks and outdoor fish ponds.

SUMMARY OF THE INVENTION

It is an object of the present invention to provide a filter system for aquatic systems which effectively reduces the quantity of toxic substances, particularly ammonia, in the system water.

It is still another object of the present invention to provide an aquatic filter system which is reliable and easily manufactured.

It is yet another object of the present invention to provide an aquatic filter system which is compact, easy to install, and simple to use.

An aquatic filter system for a pond, aquarium or commercial fish or lobster holding tank in accordance with one embodiment of the present invention comprises a rotatably mounted filter body comprising a porous mass. The filter body is positioned to receive a flow of water so that water is absorbed by the filter body mass primarily on one side of the mass. As a consequence, the filter body is unbalanced by the additional absorbed water such that rotational movement is imparted to the filter body by the additional weight of the water absorbed on one side of the body. As the filter body rotates, at least a portion of the filter body is alternately exposed to the water and the atmosphere.

In accordance with a particular novel feature of the present invention, water is supplied to the body from a receptacle located above the water absorbing body, the receptacle defining a water holding volume having a bottom, and the bottom being provided with at least one opening via which water flows out of the volume and onto the water absorbing body under the force of gravity.

Preferably, according to the invention, the bottom of the receptacle is provided with a row of holes for delivering water along the length, or a substantial portion of the length, of the water absorbing body.

According to another embodiment of the invention, a filter assembly is provided with two water absorbing bodies, each of the type described above, mounted for rotation about mutually parallel horizontal axes and the receptacle is mounted above the water absorbing bodies and is provided with two rows of holes, each of which rows delivers streams of water onto a respective one of the water absorbing bodies.

At each of the above-described embodiments, the water absorbing body or bodies are mounted in a housing which defines a container and which has ledges forming weirs which define the level of water in the container and via which water flows out of the container.

In further accordance with the invention, a filter system, or assembly, according to the invention is housed in a sump into which water flows from the filter assembly and from which water is directed back into the pond, aquarium, or tank, by means of a pump.

Other objects and aspects of the invention will become apparent to those skilled in the art from the detailed description of the invention which is presented by way of example and not as a limitation of the present invention.

DESCRIPTION OF THE PREFERRED EMBODIMENTS

Figure 1:
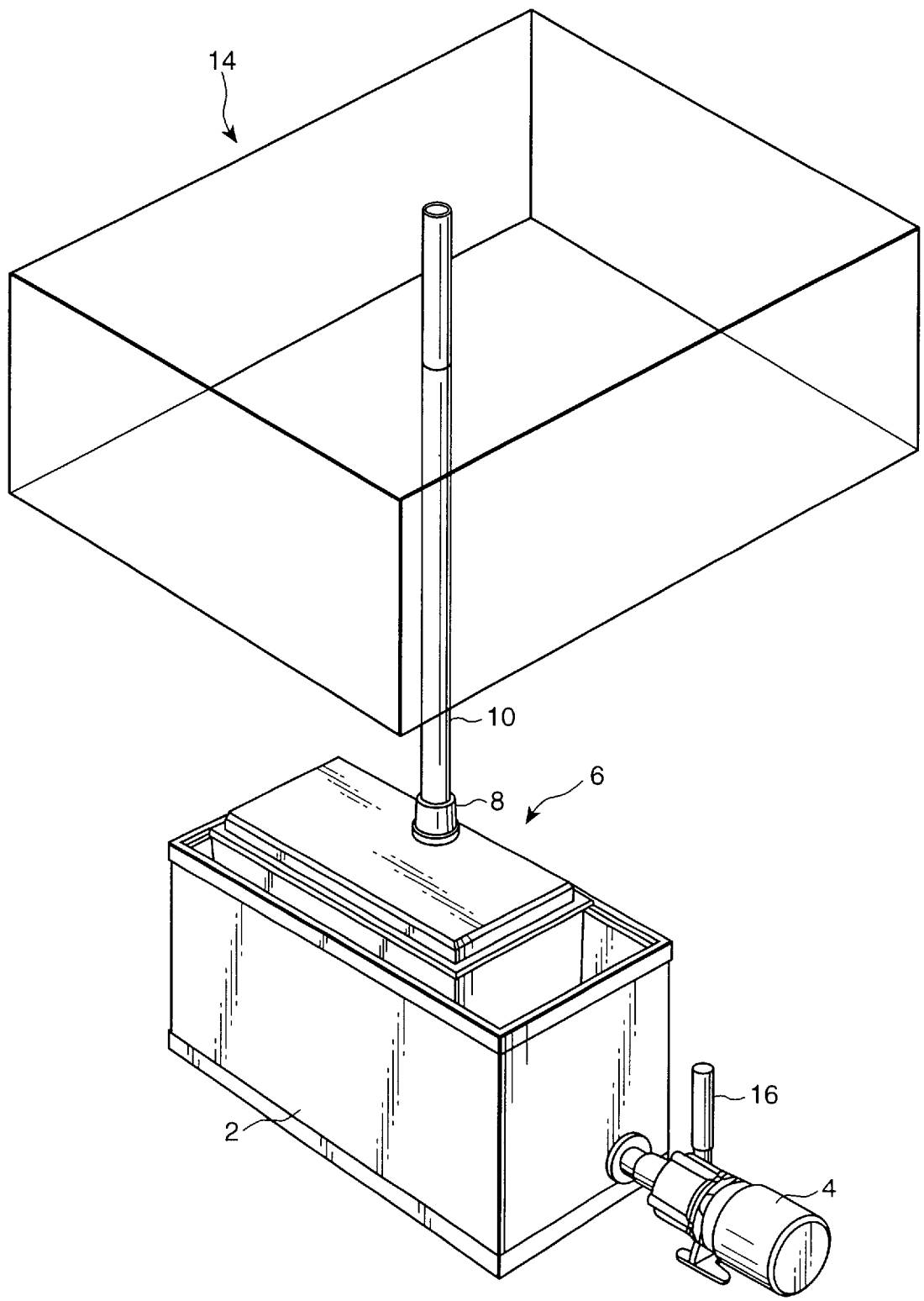
FIG. 1 is a perspective view illustrating one embodiment of a filter assembly according to the invention installed in a filter apparatus and associated with an aquarium.

The first embodiment of a filter apparatus according to the invention is shown in FIG. 1. This filter apparatus includes a sump 2 enclosing an interior space which is connected to a pump 4. Sump 2 houses a filter assembly 6 that contains a rotatable biological filter element and stationary filter elements, to be described in detail below. Filter assembly 6 is provided, at its top, with an inlet 8 to which is connected a water delivery pipe 10.

Pipe 10 extends upwardly and passes, in a sealed manner, through the bottom of an aquarium 14 containing a body of water (not shown) which is to be filtered. The upper end of pipe 10 is open and serves as a water inlet. The upper end of pipe 10 is located substantially at the desired water level in aquarium 14, and thus acts as a standpipe.

Water entering pipe 10 from aquarium 14 flows downwardly into filter assembly 6. After filtration in assembly 6,. which will be described in greater detail below, the water passes out of filter assembly 6 into the surrounding region within sump 2 and is pumped back into aquarium 14 via an outlet pipe 16 and pump 4. Thus, the rate at which water is delivered to filter assembly 6 is controlled essentially by the water flow rate produced by pump 4.

Other arrangements may be employed for delivering water from aquarium 14 to filter assembly 6. For example, this can be achieved by means of a syphon unit mounted on a sidewall of aquarium 14. Other known arrangements for conducting water from an aquarium can be employed.

As shown in FIG. 1, the filter apparatus may be located below aquarium 14. Alternatively, the apparatus could be mounted to one side of aquarium 14, with the bottom of sump 2 located at a lower level than the bottom of aquarium 14.

Figure 2:
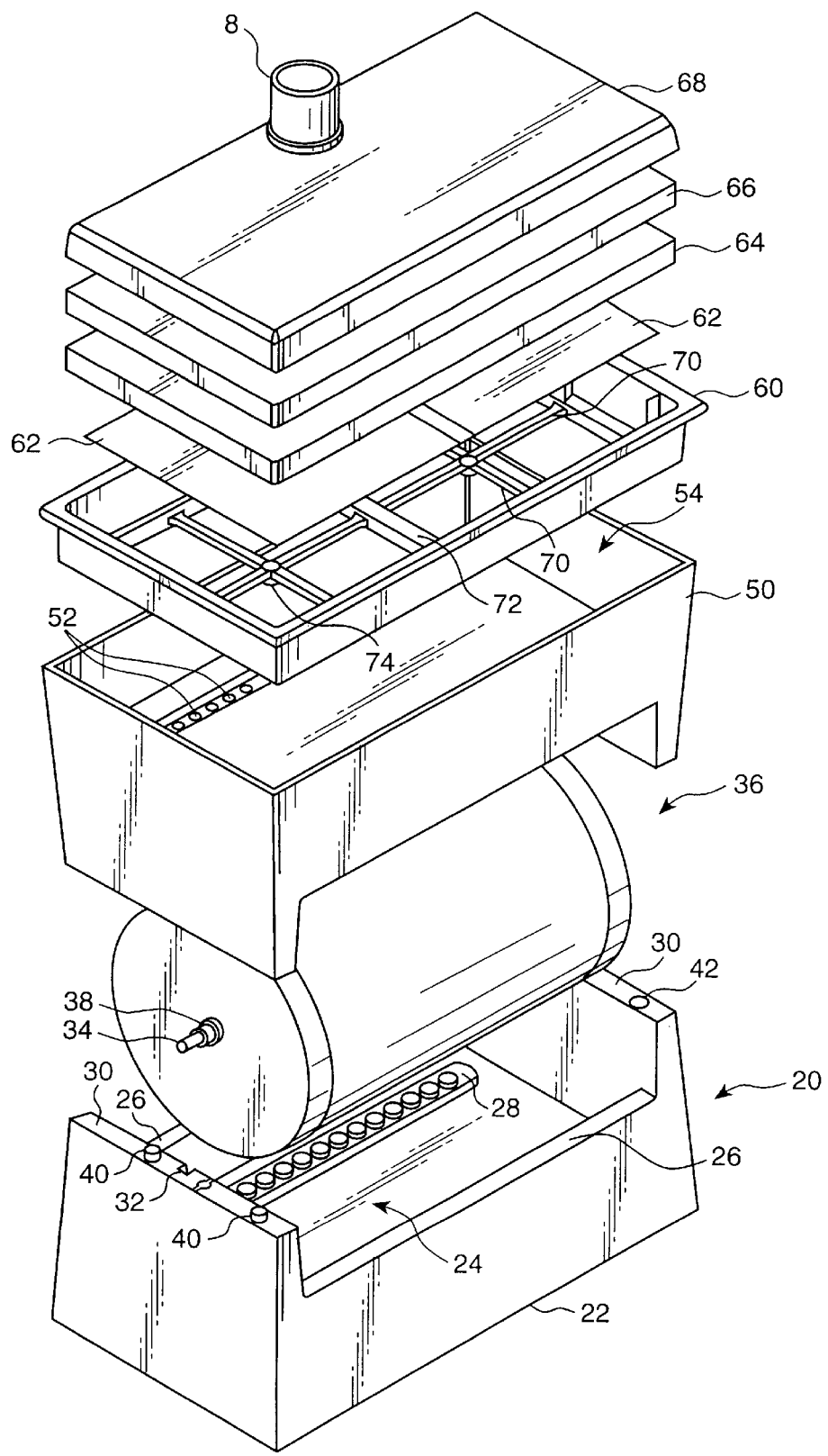
FIG. 2 is an exploded perspective view of the filter assembly of FIG. 1.

FIG. 2 is an exploded perspective view showing all of the individual components of filter assembly 6. Assembly 6 includes a lower housing 20 having a bottom 22 which will rest on the bottom of sump 2. Lower housing 20 encloses a water receiving trough 24 delimited, at two opposed edges, by weirs 26 which maintain a desired water level in trough 24 and via which water flows out of trough 24 and into the interior of sump 2. The bottom of trough 24 includes a raised portion 28.

Opposed ends 30 of housing 20 extended to a higher lever than do weirs 26 and are each provided with a recess, or groove, 32 for receiving a respective end of a shaft 34 of a rotatable biological filter element 36. Shaft 34 carries two bearings 38, one at each axial end of element 36 and one of which is visible in FIG. 2.

One end 30 of lower housing 20 is provided, at its top surface, with two positioning pins 40, while the other end 30 is provided, at its top surface, with two positioning recesses 42, one of which is visible in FIG. 2.

Lower housing 20 is covered by an upper housing 50 which, in the illustrated embodiment, is substantially identical to lower housing 20. This enables both housings to be manufactured by the same manufacturing procedure. Since upper housing 50 is inverted with respect to lower housing 20, recesses in one end of upper housing 50, corresponding to recesses 42, will mate with pins 40 of lower housing 20, while pins on upper housing 50, corresponding to pins 40, will mate with recesses 42 of lower housing 20, thereby achieving precise positioning of upper housing 50 on lower housing 20. When housings 20 and 50 are thus assembled together, they enclose a space containing filter element 36.

In the illustrated embodiment, upper housing 50 differs from lower housing 20 only in that the raised portion of upper housing 50, which corresponds to raised portion 32 of lower housing 20, is provided with a row of holes 52 which can be formed by drilling or punching. Each housing 20, 50 is formed to have a recess which defines, when a housing is oriented in the manner of housing 50, a trough 54, with holes 52 being located at the bottom thereof.

As is apparent from the illustration of housings 20 and 50, the row of holes 52 is horizontally offset from the axis of rotation of filter element 36. Water delivered into trough 54 will flow through holes 52 and onto one side of filter element 36.

Trough 54 further houses a stationary filter arrangement composed of a media tray 60, two screens 62, a granular chemical media layer 64, a mechanical filter pad 66, and a cover 68 which carries inlet 8. Cover 68 is optional but is advantageously provided to trap water vapor and prevent splashing of water introduced via inlet 8, thereby minimizing condensation in the system and salt creep in the case of salt water systems.

The mechanical filtering arrangement may also include a conventional diffuser (not shown), above filter pad 66 to disperse water across the entire surface of filter pad 66.

Media tray 60 has essentially an open bottom provided with a grid arrangement 70 for supporting screens 62. The grid arrangement includes a central strut 72 which separates, and provides proper positioning for, screens 62. Media tray 60 may be provided with mounting feet 74, two of which are shown in FIG. 2, for supporting tray 60 on the bottom of trough 54 while providing a gap constituting a water storage space between tray 60 and the bottom of trough 54.

Screens 62 may be made of polymer material having a mesh size selected to prevent loose media of layer 64 from passing through screen 62, while allowing water to flow readily therethrough.

Layer 64 may be constituted by a layer of loose granules, such as activated carbon, etc. Alternatively, layer 64 can be constituted by mass of loose granules held in a porous cover.

The mechanical filter pad 66 is of a conventional mechanical filtering material which acts to filter out particles that may be suspended within the aquarium water.

The stationary mechanical filter arrangement including screens 62, media layer 64 and filter pad 66 is preferably arranged, as shown in the drawing, at the top of filter assembly 6 to facilitate replacement of any one of screens 62, layer 64 and filter pad 66. The illustrated arrangement is capable of receiving either a loose chemical media layer or a pre-packed chemical media layer, as described above.

Figure 3:
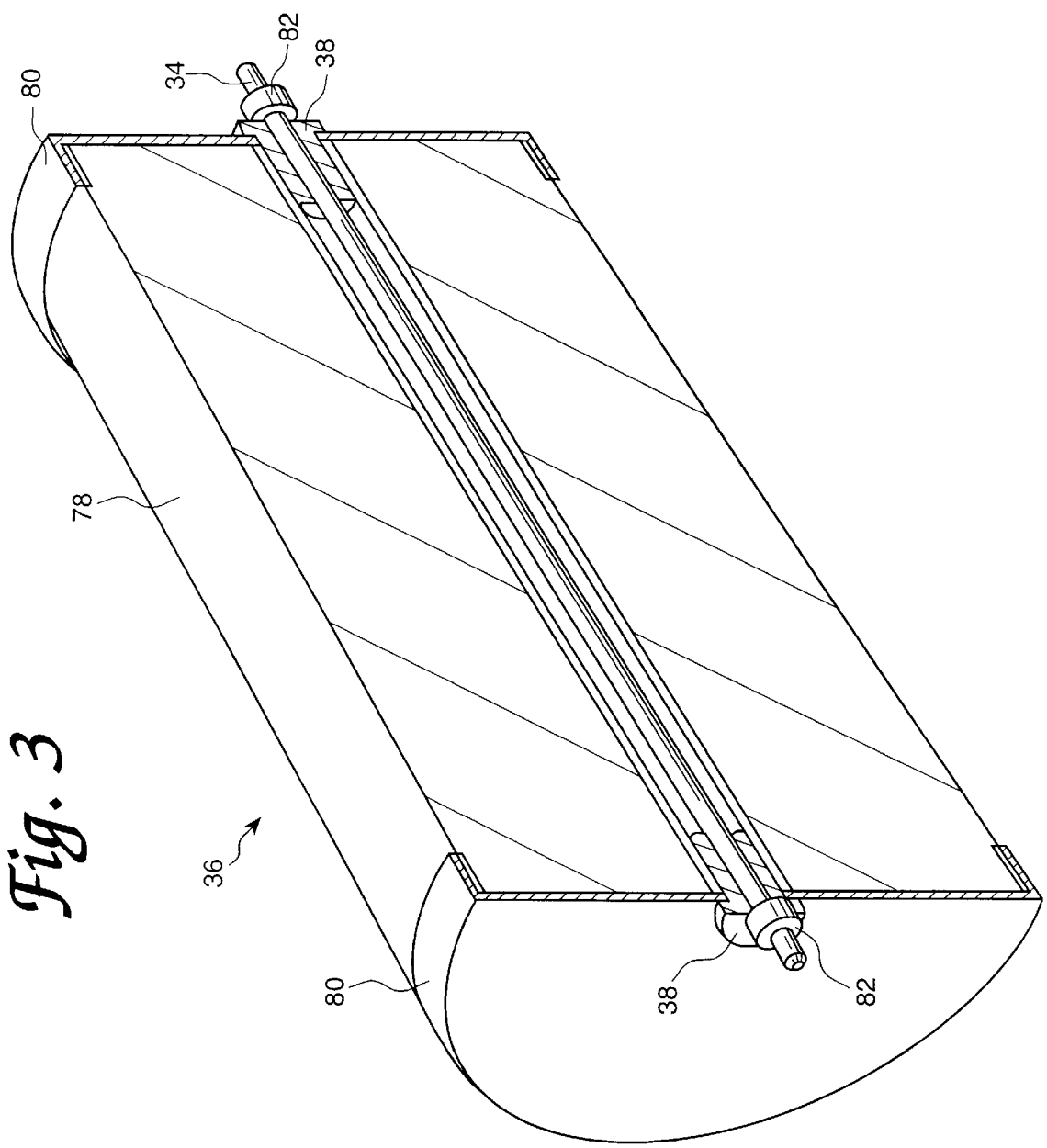
FIG. 3 is a perspective, cross-sectional view of a rotating filter element of the assembly of FIGS. 1 and 2.

FIG. 3 is a cut-away perspective view showing parts of rotatable filter element 36 of FIG. 2 in cross-section. As shown in FIG. 3, rotatable filter element 36 includes a one-piece cylinder 78 made of a unitary porous mass of material formed around a center tube 79. Center tube 79 provides an axial through-hole for receiving central shaft 34. Cylinder 78 is supported at its axial ends by end caps 80 which are, in turn, supported by bearings 38. Bearings 38 are press fitted onto shaft 34. After shaft 34 has been inserted through bearings 38 and through center tube 79, two cylindrical spacers 82 may be pressed onto shaft 34 to maintain bearings 38 in position relative to end caps 80 and to clamp each end cap 80 between a flange of a respective bearing 38 and a respective end of center tube 79. Spacers 82 maintain end caps 80 in engagement with cylinder 78 and center tube 79, and out of contact with the sides of housings 20 and 50.

As an alternative to a single shaft 34, it may be desirable to provide two stub shafts, each at a respective end of cylinder 78 and each supporting a respective bearing 38.

In an alternative embodiment, the rotary filter element 16 may be formed by a plurality of disks (not shown), each formed of a unitary porous mass of material and having a central aperture. The disks can be stacked to each other to form a cylindrical shape and may be lightly compressed between end caps 80 so that the discs and end caps 80 rotate together.

According to a further alternative, cylinder 78 may be coupled to central shaft 34 by means of an adhesive, a friction fit, or in any other suitable manner which will be apparent to those skilled in the art, in which case shaft 34 will rotate with cylinder 78 and end caps 80, and recesses 32 will function as slide bearings for shaft 34.

Although the body 26 is illustrated as a cylinder, the filter media body may have a variety of other shapes as well.

Any one of several appropriate water-absorptive or porous bodies of materials may be used to form media cylinder 78. However, to maximize the surface areas of the filter media which are available for the growth of aerobic bacteria, and to facilitate quick absorption and drainage of water, media cylinder 78 is preferably formed by a porous, reticulated cellular sponge-like material which comprises a mass of numerous broken cells interconnected by strands. For example, one such porous body of material is a reticulated ether-based polyurethane foam (copending U.S. application Ser. No. 08/125,445, FIG. 2) having a porosity of 10–60 pores per inch. In another preferred embodiment of the present invention, media cylinder 78 may be formed by a porous, reticulated, fibrous material sold under the trade name "Aquacell Plus" (copending U.S. application Ser. No. 08/125,445, FIG. 3) by Hobbs Industries. The Aquacell Plus material comprises a mass of numerous fibers and a resin which bridges between the fibers to define numerous irregular sized broken cells. It has been recognized that water readily permeates through pores of the reticulated mass such that the porous body of material can relatively promptly absorb, and then subsequently discharge, water. However, it should be understood that there are a variety of other materials which can be formed into a body or mass which relatively promptly absorbs and drains water. Accordingly, the scope of the present invention should not be limited by those materials expressly described herein.

Referring back to FIG. 2, the water exiting from holes 52 is generally applied to one side only of the surface of cylinder 78, for example the side which is to the rear of a vertical plane passing through shaft 34, so that the applied water is absorbed primarily by one side only of cylinder 78. As a result, the applied water adds additional weight on that side of filter element 36, which unbalances the filter element about shaft 34, causing filter element 36 to rotate about the axis of shaft 34 in the counterclockwise direction. To unbalance filter element 36 about shaft 34 in this manner, the system water may be sprayed or otherwise applied along the entire length, or only in a limited area along the length, of filter element 36. Aquatic system water absorbed by cylinder 78 subsequently drains from the porous mass of material of cylinder 78 as each portion of cylinder 78 rotates upwardly in turn out of standing water in trough 24, the lower part of cylinder 78 being immersed in that water. Therefore, as long as water is applied to one side cylinder 78 of filter element 36, the porous mass of cylinder 78 at that side will contain more absorbed water than does the other side of the porous mass. As a consequence, the one side will apply a greater moment arm on the shaft 34 as compared to the moment arm applied by the other side. In other words, the two sides will be unbalanced, causing filter element 36 to rotate as long as water is applied to the one side of cylinder 78.

It is believed that the rotational force applied to filter element 36 is primarily that provided by the net difference in weight of the water absorbed by the two sides of the absorptive mass of cylinder 78, rather than any impulse force provided by water striking the filter element from the holes 52.

As filter element 36, rotates each portion of cylinder 78 is in turn exposed alternately to the system water and to the air, which fosters the growth of aerobic bacteria on the surface of, and within, cylinder 78 and brings the aerobic bacteria into contact with the water being treated. In this manner, the aerobic bacteria on and in cylinder 78 can remove toxins, including ammonia and nitrites, from the treated water. Since cylinder 78 is formed by a water-absorptive, porous mass of material, the combined internal and external surface areas of cylinder 78 provide an extremely large effective surface area in contact with system water, which is much larger than the external surface of a non-porous filter element. As a result, the efficiency of the biological filtration is substantially improved.

It is believed that cylindrical filter element 36 should preferably rotate at a rotation speed of approximately 0.5 to 10 R.P.M., more preferably at approximately 1 to 5 R.P.M. to provide an optimum biological filtration efficiency. In one aspect of the present invention, the rotation speed of filter element 36 is determined by its submersion depth in water in trough 24, the rate of the water flow from holes 52, and the vertical distance from the centerline of filter element 36 at which the water flow is deposited on filter element 36. Thus, in some applications it may be desirable to vary one or more of the submersion depth and the water flow rate in order to make the device rotational speed easy to adjust under a variety of operating conditions. In the illustrated embodiment, water flow rate is determined essentially by the speed of pump 4.

In a preferred embodiment of the present invention, the submersion depth of filter element 36 is selected to be up to approximately 40% of the diameter of media cylinder 78; in the illustrate embodiment, the submersion depth is approximately 15–20% of the diameter of cylinder 78, to achieve the above mentioned rotation speed.

The submersion depth may be changed by any one of various methods. For example, the position of shaft 34 may be changed with respect to the height of weirs 26 to change the submersion depth. Alternatively, the water level in trough 24 may be changed, to change the submersion depth, by adding movable components to housing 20 to provide weirs having an adjustable height.

In assemblies according to the invention, the axis of rotation of the rotating filter element need not pass through a unitary absorptive body of material. Instead, the filter element may include a plurality of absorptive masses of reticulated material housed in compartments of the filter element. Other embodiments can also be envisioned.

In the apparatus shown in FIGS. 1 and 2, and described above, the water level in sump 2, in the region surrounding assembly 6, will typically be lower than the level of water in trough 4, as determined by the height of weirs 26. In order to increase the water holding capacity of sump 2, a support structure could be placed in sump 2 in order to elevate assembly 6. This might also be done to bring the height of cover 68 to the same level of the top of sump 2 if the interior of sump 2 has a greater height than does assembly 6.

Figure 4:
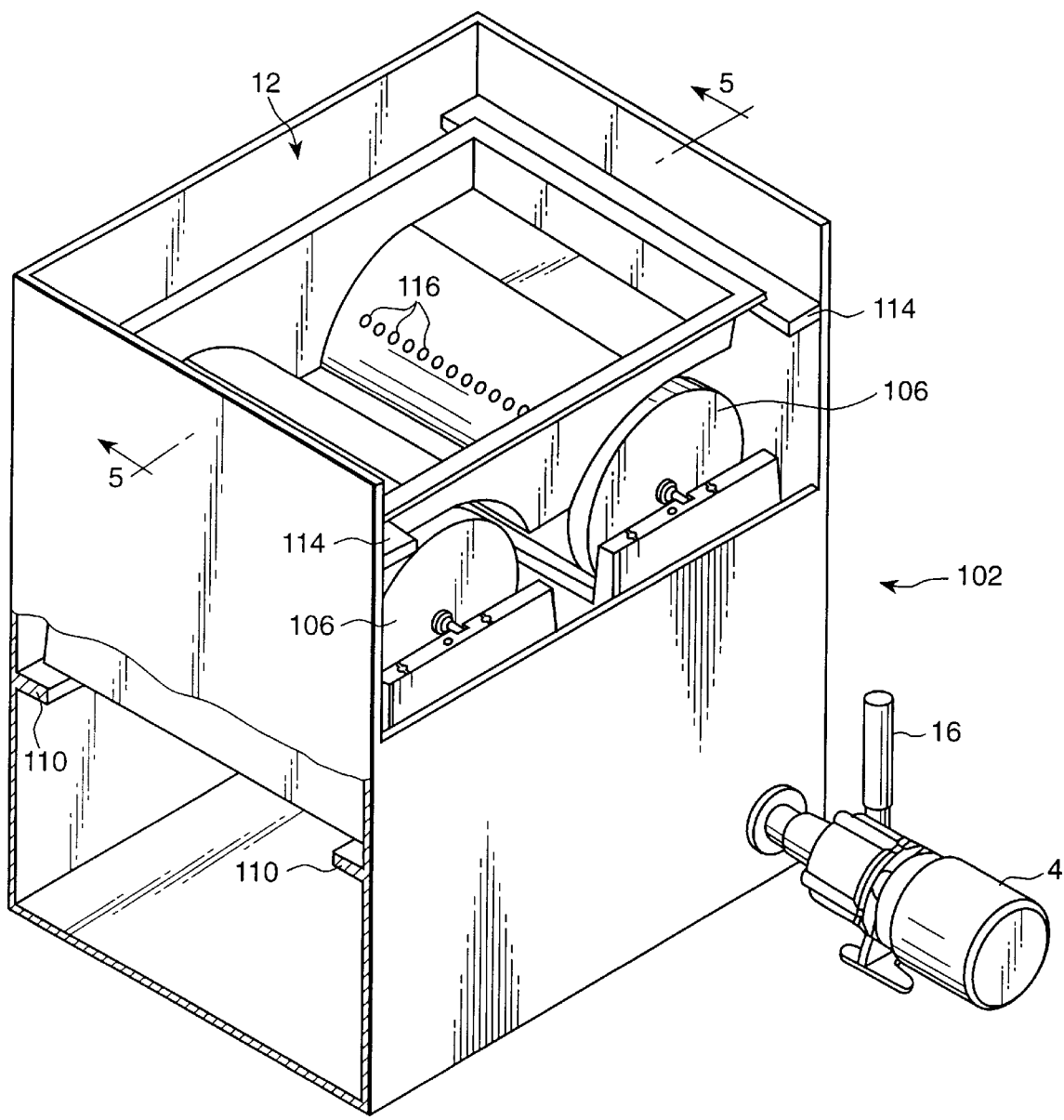
FIG. 4 is a perspective view of a second embodiment of apparatus according to the invention.
Figure 5:
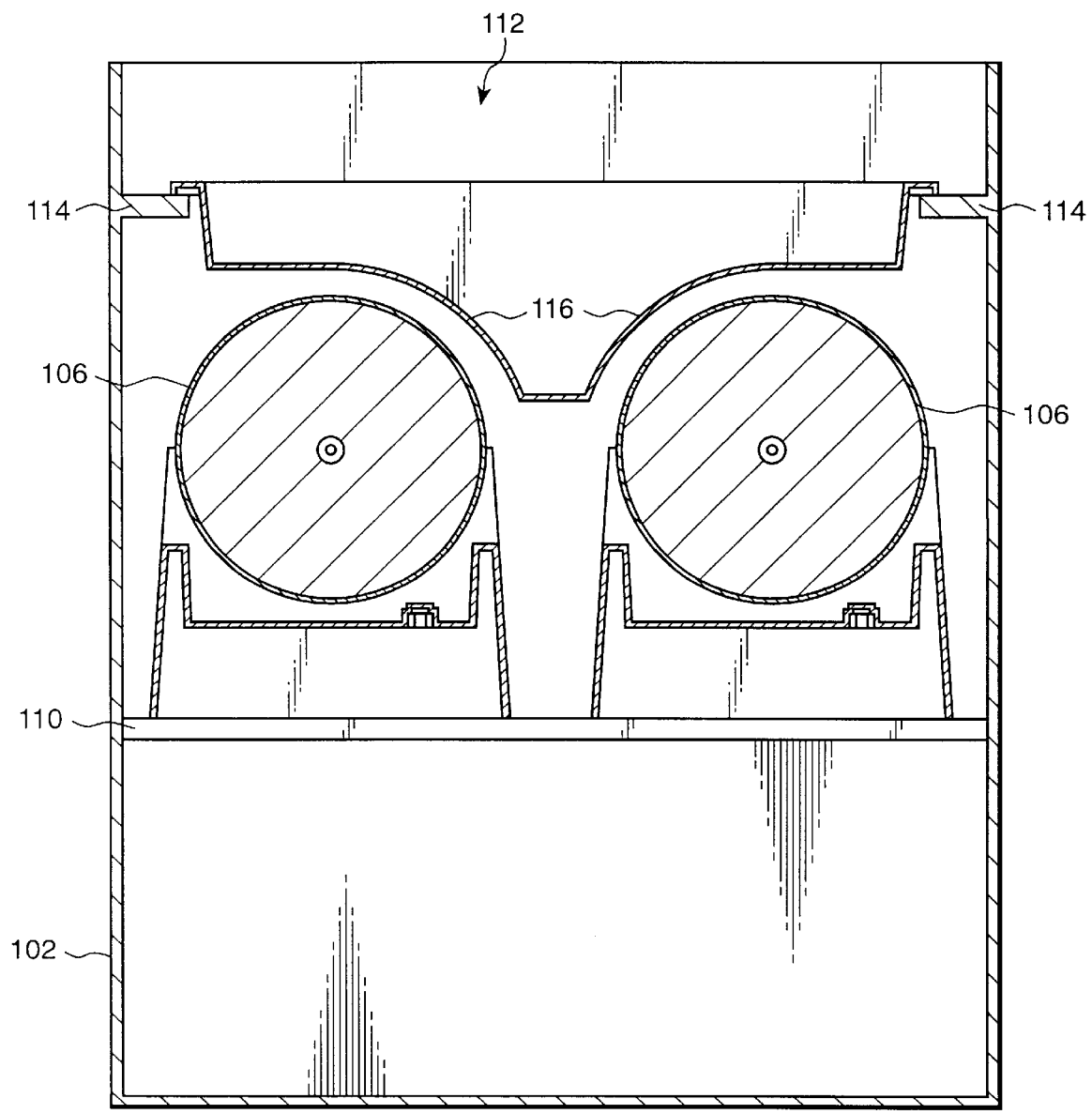
FIG. 5 is a cross-sectional view taken along the line 5—5 of FIG. 4.

A second embodiment of the present invention is illustrated in FIGS. 4 and 5. FIG. 4 is a perspective view which is partly broken away at one side while FIG. 5 is a cross-sectional view along line 5—5 of FIG. 4.

This embodiment includes a sump 102 which is substantially larger than sump 2 of the embodiment shown in FIG. 1. Sump 102 contains two filter assemblies 106. In this embodiment, each filter assembly 106 consists of a lower housing (20) and a rotatable filter element (36) identical to those illustrated in FIGS. 1–3.

Filter assemblies 106 are mounted on ledges 110 formed at the interior of sump 102. As in the embodiment of FIG. 1, the interior of sump 102 communicates with a pump 4 having an outlet pipe 16 for delivering water back to an aquarium or other water tank. Mounted above assemblies 106 is a media tray 112 supported on two further ledges 114 located above ledges 110.

Media tray 112 is bilaterally symmetrical about a line parallel to the axes of rotation of the filter elements of assemblies 106. At each side of its axis of symmetry, the bottom of media tray 112 has a curved portion which slopes downwardly toward the center of tray 112. Each curved portion is provided with a row of drilled or punched holes 116, one of which rows is visible in FIG. 4. Each row of holes 116 delivers water streams to the rotatable filter element of a respective assembly 106 and performs essentially the same function as the row of holes 52 provided in the embodiment of FIGS. 1–3.

Media tray 112 may contain a chemical filter constituted by a porous casing, made for example of polyester, filled with a granular chemical filtration medium, such as activated carbon. This chemical filter can have the form described above with respect to filter layer 66 of the embodiment of FIGS. 1–3. Alternatively, a screen, corresponding in composition to one of the screens 62 of the embodiment of FIGS. 1–3, may be laid across the bottom of tray 112 to span the depressed portion of that bottom, and a layer of a loose granular chemical medium can be deposited on the screen.

Optionally, a mechanical filter pad, such as pad 66 of the embodiment shown in FIGS. 1–3, may be laid atop the chemical media layer. The mechanical filter pad in this embodiment, like pad 66 of the embodiment of FIGS. 1–3, may be made of a suitable polyester.

Because the mechanical filter components correspond in form essentially to those shown in FIG. 2, they are not illustrated in FIGS. 4 and 5.

The embodiment of FIGS. 4 and 5 may be completed by a cover corresponding in form to cover 68 of the embodiment of FIGS. 1–3 and the cover may be provided with an inlet corresponding to inlet 8 of the latter embodiment. Here again, the inlet would be connected to an associated aquarium or other water tank in the manner shown in FIG. 1.

In both illustrated embodiments, the chemical media layer and the screens, such as screens 62, may be omitted so that water flowing through the mechanical filter pad will pass directly, via holes 52, 116, to the underlying rotatable filter element or elements 36.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a biological filter for treating water in an aquatic system, comprising:

a porous water absorbing body of material adapted for rotation; and means for supplying water to the body to be absorbed by a portion of the body so as to cause the body to rotate, the improvement wherein said means for supplying water to the body comprise a receptacle located above said water absorbing body, said receptacle defining a water holding volume having a bottom, and said bottom being provided with at least one opening via which water flows out of said volume and onto said water absorbing body under the force of gravity.

2. The filter of claim 1 wherein the body is a unitary mass of reticulated, cellular foam and the axis of rotation passes through the body.

3. The filter of claim 1 wherein the body is a mass of interconnected fibers and the axis of rotation passes through the body.

4. The filter of claim 1 wherein said material of said porous water absorbing body is selected to absorb a weight of water to unbalance said body about its axis of rotation to thereby impart rotational movement to said body to expose at least a portion of said body alternately to water and the atmosphere.

5. The filter of claim 1, wherein the material of said water absorbing body is a reticulated material to increase the surface area available for bacteria growth.

6. A filter assembly comprising a biological filter as defined in claim 1, and a container for receiving said body and containing water in which a portion of said body is submerged, said container having a weir portion over which water flows out of said container, wherein the height of the weir portion defines the level of water in said container.

7. The filter assembly of claim 6, wherein the material of said body is a reticulated ether-based polyurethane foam having a porosity of 10–60 pores per inch.

8. The filter assembly of claim 6, wherein the material of said body includes reticulated fibers and a resin at least partially bridging said reticulated fibers to define pores in said reticulated fibers.

9. The filter assembly of claim 8, wherein said reticulated, fibrous material is "Aquacell Plus" made by Hobbs Industries.

10. The filter of claim 1 further comprising means supporting the porous water absorbing body for rotation about a substantially horizontal axis, and wherein said porous water absorbing body extends vertically between an upper extremity and a lower extremity, and said means for supplying water are disposed for directing water onto said body at a location between the upper extremity and the lower extremity.

11. The filter of claim 1 further comprising at least one mechanical filtering element mounted in said receptacle above said bottom of said receptacle for filtering water prior to delivery to said porous water absorbing body, and a cover disposed above said mechanical filtering element, said cover having a water inlet for delivering water to said mechanical filtering element.

12. The filter of claim 11 further comprising a sump in which said porous water absorbing body is installed and a pump connected for pumping water from said sump to the aquatic system.

13. The filter of claim 1 wherein there are two said porous water absorbing bodies of material adapted for rotation, and wherein said receptacle is provided with two rows of openings via which water flows out of said bottom, with each of said rows of openings being disposed for delivering water to a respective one of said porous water absorbing bodies.

14. The filter of claim 13 wherein each said body is a unitary mass of reticulated, cellular foam and the axis of rotation passes through the body.

15. The filter of claim 13 wherein each said body is a mass of interconnected fibers and the axis of rotation passes through the body.

16. The filter of claim 13 wherein said material of each said porous water absorbing body is selected to absorb a weight of water to unbalance said body about its axis of rotation to thereby impart rotational movement to said body to expose at least a portion of said body alternately to water and the atmosphere.

17. The filter of claim 13, wherein the material of each said water absorbing body comprises a reticulated material to increase the surface area available for bacteria growth.

18. A filter assembly comprising a biological filter as defined in claim 13, and two containers each for receiving a respective one said bodies and containing water in which a portion of each of said bodies is submerged, each said container having a weir portion over which water flows out of said container, wherein the height of the weir portion defines the level of water in said container.

19. The filter assembly of claim 18, wherein the material of each of said bodies is a reticulated ether-based polyurethane foam having a porosity of 10–60 pores per inch.

20. The filter assembly of claim 18, wherein the material of each of said bodies includes reticulated fibers and a resin at least partially bridging said reticulated fibers to define pores in said reticulated fibers.

21. The filter assembly of claim 20, wherein said reticulated, fibrous material is "Aquacell Plus" made by Hobbs Industries.

22. The filter of claim 13 further comprising means supporting each of said porous water absorbing bodies for rotation about a substantially horizontal axis, and wherein each of said porous water absorbing bodies extends vertically between an upper extremity and a lower extremity, and said means for supplying water are disposed for directing water onto each of said bodies at a location between the upper extremity and the lower extremity.

23. The filter of claim 13 further comprising at least one mechanical filtering element mounted in said receptacle above said bottom of said receptacle for filtering water prior to delivery to said porous water absorbing bodies, and a cover disposed above said mechanical filtering element, said cover having a water inlet for delivering water to said mechanical filtering element.

24. The filter of in claim 23 further comprising a sump in which said porous water absorbing bodies are installed and a pump connected for pumping water from said sump to the aquatic system.

25. A biological filter for treating water in an aquatic system, comprising:

a porous water absorbing body of material adapted for rotation about an axis of rotation; and a receptacle located above said water absorbing body, said receptacle defining a water holding volume having a bottom, and said bottom being provided with at least one opening via which water flows out of said volume and onto said water absorbing body under the force of gravity.

26. The filter of claim 25 wherein the body is a unitary mass of reticulated, cellular foam and the axis of rotation passes through the body.

27. The filter of claim 25 wherein the body is a mass of interconnected fibers and the axis of rotation passes through the body.

28. The filter of claim 25 further comprising a shaft supporting said porous water absorbing body and bearings supporting said shaft for rotation of said body about a substantially horizontal axis, and wherein said porous water absorbing body extends vertically between an upper extremity and a lower extremity, and said at least one opening is disposed for directing water onto said body at a location between the upper extremity and the lower extremity.

29. The filter of claim 25 further comprising at least one mechanical filtering element mounted in said receptacle above said bottom of said receptacle for filtering water prior to delivery to said porous water absorbing body, and a cover disposed above said mechanical filtering element, said cover having a water inlet for delivering water to said mechanical filtering element.

30. The filter of claim 29 further comprising: a sump in which said porous water absorbing body is installed; and a pump connected for pumping water from said sump to the aquatic system.

31. The filter of claim 25 wherein there are two said porous water absorbing bodies of material, each of said bodies being adapted for rotation about a respective axis of rotation, and wherein said receptacle is provided with two rows of openings via which water flows out of said bottom, with each of said rows of openings being disposed for delivering water to a respective one of said porous water absorbing bodies.

32. The filter of claim 31 wherein each said body is a unitary mass of reticulated, cellular foam and the respective axis of rotation passes through the body.

33. The filter of claim 31 wherein each said body is a mass of interconnected fibers and the respective axis of rotation Passes through the body.

34. A filter assembly comprising a biological filter as defined in claim 31, and two containers each for receiving a respective one said bodies and containing water in which a portion of each of said bodies is submerged, each said container having a weir portion over which water flows out of said container wherein the height of the weir device defines the level of water in said container.

35. The filter of claim 31 further comprising two shafts each supporting a respective one of said porous water absorbing bodies and bearings supporting each said shaft for rotation of each of said porous water absorbing bodies about a respective substantially horizontal axis, and wherein each of said porous water absorbing bodies extends vertically between an upper extremity and a lower extremity, and each of said rows of openings is disposed for directing water onto a respective one of said bodies at a location between the upper extremity and the lower extremity.

36. The filter of claim 31 further comprising at least one mechanical filtering element mounted in said receptacle above said bottom of said receptacle for filtering water prior to delivery to said porous water absorbing bodies, and a cover disposed above said mechanical filtering element, said cover having a water inlet for delivering water to said mechanical filtering element.

37. The filter of claim 36 further comprising a sump in which said porous water absorbing bodies are installed and a pump connected for pumping water from said sump to the aquatic system.

38. The filter assembly of claim 6 wherein said container is structurally substantially identical to said receptacle.

39. The filter assembly of claim 38 wherein said container and said receptacle are provided with positioning elements which interengage with one another for holding said receptacle in a defined position on said container.

40. The filter assembly of claim 6 wherein said container and said receptacle are provided with positioning elements which interengage with one another for holding said receptacle in a defined position on said container.

* * * * *